US012132521B2

(12) United States Patent
Vassilieva et al.

(10) Patent No.: US 12,132,521 B2
(45) Date of Patent: Oct. 29, 2024

(54) OPTICAL SIGNAL ADJUSTMENT

(71) Applicant: Fujitsu Limited, Kawasaki (JP)

(72) Inventors: Olga I. Vassilieva, Plano, TX (US);
Inwoong Kim, Allen, TX (US);
Paparao Palacharla, Richardson, TX (US)

(73) Assignee: Fujitsu Limited, Kawasaki (JP)

( * ) Notice: Subject to any disclaimer, the term of this patent is extended or adjusted under 35 U.S.C. 154(b) by 130 days.

(21) Appl. No.: 17/978,097

(22) Filed: Oct. 31, 2022

(65) Prior Publication Data

US 2024/0146415 A1  May 2, 2024

(51) Int. Cl.
*H04B 10/27* (2013.01)
*H04B 10/69* (2013.01)

(52) U.S. Cl.
CPC .......... *H04B 10/27* (2013.01); *H04B 10/697* (2013.01)

(58) Field of Classification Search
CPC .............................. H04B 10/27; H04B 10/697
USPC ........................................................... 398/58
See application file for complete search history.

(56) References Cited

U.S. PATENT DOCUMENTS

2003/0087634 A1* 5/2003 Raghavan ........... H04L 27/2601
455/423
2010/0073190 A1* 3/2010 Fanini ................. G01V 11/002
340/855.7
2021/0234784 A1* 7/2021 Zeng .................... H04L 43/0894
2022/0353003 A1* 11/2022 Burtsev ............... H04J 14/0271

FOREIGN PATENT DOCUMENTS

JP          2004503181 A  *  1/2004   ......... H04L 27/2637
WO     WO-9522859 A1  *  8/1995   ............ H04B 1/707

OTHER PUBLICATIONS

"Maximizing the CapacityReach of 800G Generation Coherent: Baud Rates, Features, and Modem SNR", 2020. Infinera. https://www.infinera.com/wp-content/uploads/Maximizing-the-Capacity-Reach-of-800G-Generation-Coherent-0271-WP-RevA-0920.pdf.
C. Lasagni et al., "Power Allocation Optimization in the Presence of Stimulated Raman Scattering", ECOC 2021, paper Tu1D.3.
D. Che, W. Shieh "Entropy loading: Multi-Carrier Constellation Shaping for Colored-SNR Optical Channels", OFC 2017, paper Th5B.4.
L. Galdino et al., "Optical Fibre Capacity Optimization via Continuous Bandwidth Amplification and Geometric Shaping", JLT 2020.

* cited by examiner

*Primary Examiner* — Abbas H Alagheband
(74) *Attorney, Agent, or Firm* — Maschoff Brennan

(57) ABSTRACT

A method of optical signal adjustment may include obtaining a number of bits per second of data transmission in a frequency channel of an optical network. The method may also include directing a reduction in a number of bits per symbol transmitted in the frequency channel and directing an increase in a number of symbols transmitted per second in the frequency channel to maintain the number of bits per second of data transmission in the frequency channel.

17 Claims, 7 Drawing Sheets

OPTICAL SIGNAL ADJUSTMENT

FIELD

The embodiments discussed in the present disclosure are related to optical signal adjustment.

BACKGROUND

An optical network may include multiple different frequency channels that may carry optical signals. Each frequency channel may have different frequencies and thus may affect optical signals carried thereon differently. For example, frequency channels with higher frequencies may result in higher non-linear noise affecting optical signals carried thereon than frequency channels with lower frequencies.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

In an example embodiment, a method of optical signal adjustment may include obtaining a number of bits per second of data transmission in a frequency channel of an optical network. The method may also include directing a reduction in a number of bits per symbol transmitted in the frequency channel and directing an increase in a number of symbols transmitted per second in the frequency channel to maintain the number of bits per second of data transmission in the frequency channel.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

An optical network may be configured to support propagation of optical signals between a source and destination. In some circumstances, an optical network may be configured to multiple different frequency channels that may carry optical signals. The different frequency channels may include different frequencies. The difference in frequencies may result in different non-linear noises in the different frequency channels and thus different signal-to-noise ratios (SNR)s for optical signals carried by the different frequency channels. In some circumstances, it may be desirable to have a similar or same SNR margin for optical signals carried by the different frequency channels. A SNR margin may indicate an amount that a SNR is above a threshold SNR for a particular bit error rate.

Some embodiments of the current disclosure may be directed to adjusting one or more characteristics of one or more optical signals to reduce or remove a difference between SNR margins among one or more optical signals carried by different frequency channels of an optical network. In these and other embodiments, the current disclosure may adjust one or more characteristics of an optical signal in a manner to maintain a data rate, e.g., a number of bits of information transmitted per second, of the optical signal.

In some embodiments, the characteristic of an optical signal that may be adjusted may include a number of bits per symbol and/or a number of symbols transmitted per second. In these and other embodiments, the number of bits per symbol may be adjusted by decreasing the number of bits per symbol. Decreasing the number of bits per symbol may increase the SNR margin of an optical signal. In these and other embodiments, the number of symbols transmitted per second may be increased such that the data rate of the optical signal may be maintained.

Figure 1A:
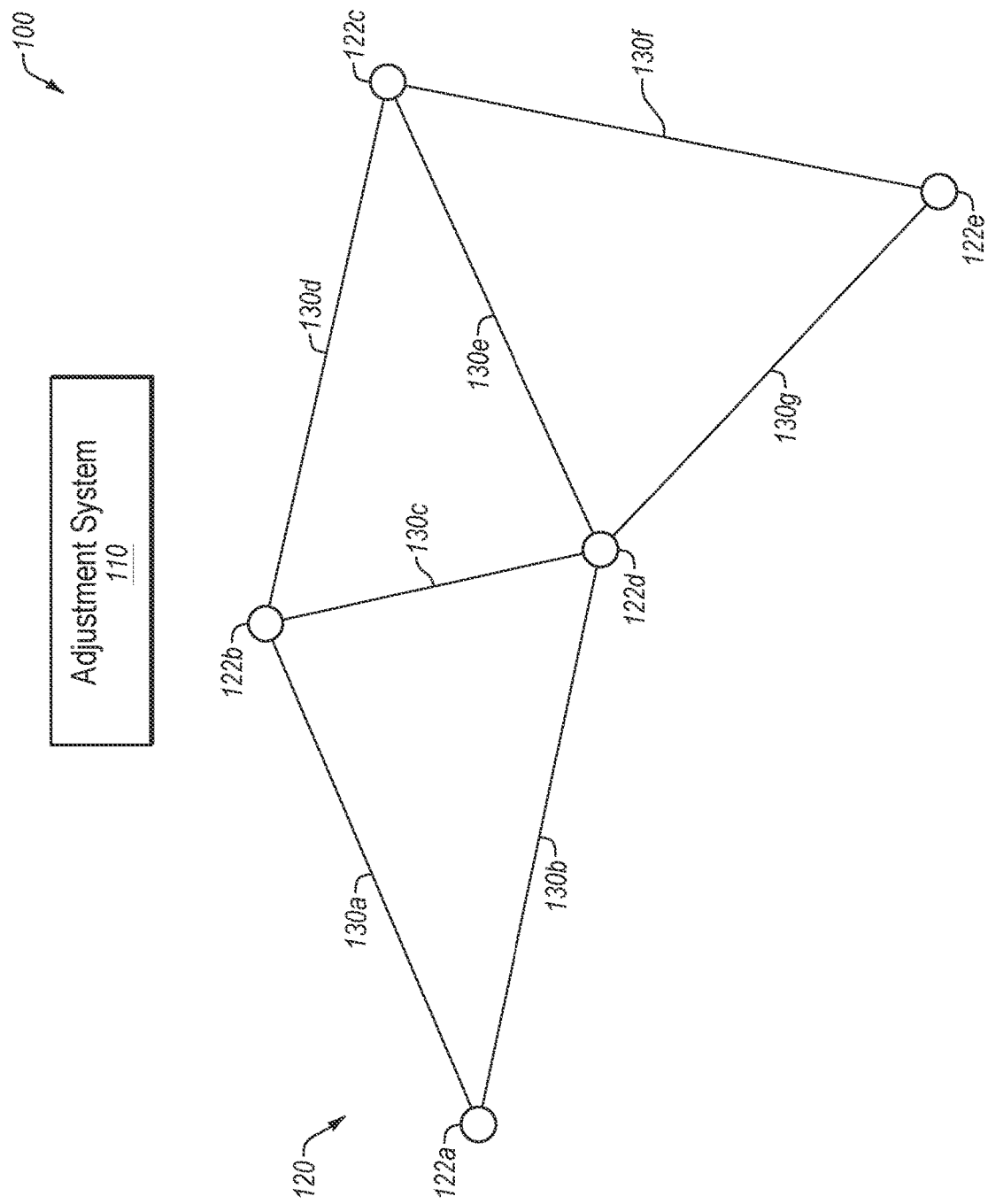
FIG. 1A illustrates an example environment for optical signal adjustment in an optical network.

Turning to the figures, FIG. 1A illustrates an example environment 100 for optical signal adjustment in an optical network, according to at least one embodiment in the present disclosure. The environment 100 may include an adjustment system 110 and an optical network 120. The optical network 120 may include a first network node 122a, a second network node 122b, a third network node 122c, a fourth network node 122d, and a fifth network node 122e, referred to collectively as the optical nodes 122. The optical network 120 may further include a first optical link 130a, a second optical link 130b, a third optical link 130c, a fourth optical link 130d, a fifth optical link 130e, a sixth optical link 130f, and a seventh optical link 130g, referred to collectively as the optical links 130. Each of the optical links 130 may extend between two of the optical nodes 122 as illustrated in FIG. 1.

In some embodiments, each of the optical links 130 may include an optical fiber that connects a transponder in one network node and a receiver in another network node of the optical network 120. For example, the first optical link 130a may include a transponder in the first network node 122a, a receiver in the second network node 122b, and an optical fiber between the first network node 122a and the second network node 122b that is coupled between the transponder and the receiver. In some embodiments, the first optical link 130a may include other optical elements, such as repeaters, wave division multiplexers, amplifiers, and other optical elements.

In some embodiments, the optical fibers that connect optical elements in the optical network 120 may be configured to carry optical signals and may be any type of optical fiber. For example, the optical fiber may be a dispersion-shifted fiber (DSF), a single-mode optical fiber (SMF), or a multi-mode optical fiber (MMF), among other types of optical fibers. The optical fibers may have varying lengths, such as, any number of feet, meters, or kilometers. For example, the optical fiber may have a length that ranges between 1 inch and 300 or more kilometers.

An optical signal may be transmitted within the optical network 120. The optical signal may follow an optical path through the optical network 120. The optical path may include any number of optical elements within the optical network 120. For example, an optical path may commence at the first network node 122a and end at the third network node 122c and include the first optical link 130a, the second network node 122b, the third optical link 130c, the fourth network node 122d, and the fifth optical link 130e. Thus, the optical path may include multiple optical elements.

Figure 1B:
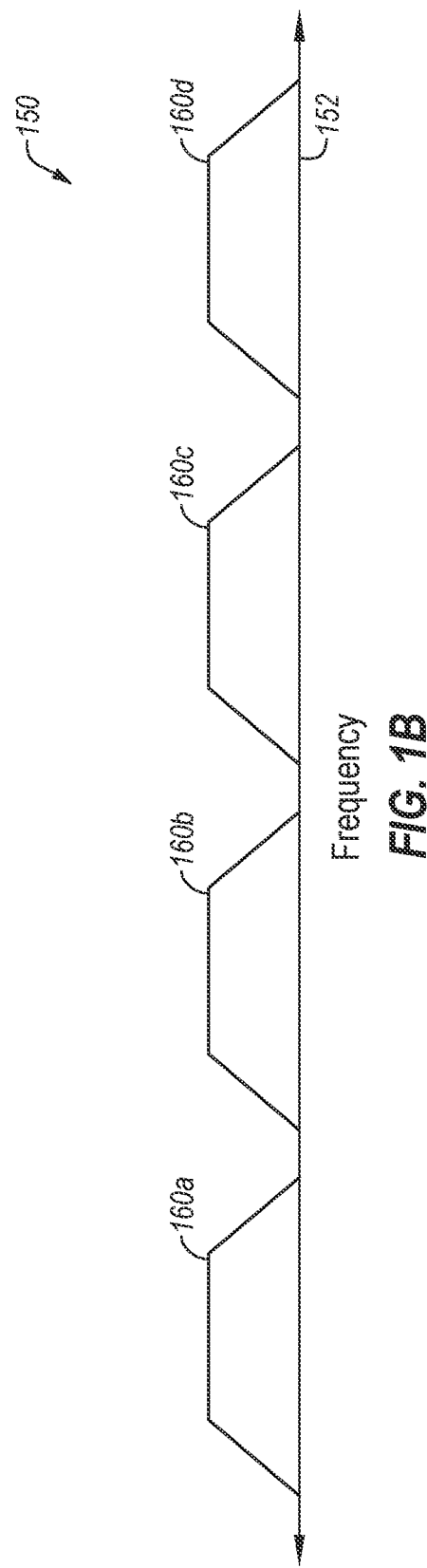
FIG. 1B illustrates frequency channels of an optical network.

An optical path may include a frequency bandwidth along which optical signals may propagate. The frequency bandwidth may be divided into frequency channels. An optical signal may traverse the optical path in one or more frequency channels. FIG. 1B illustrates an example optical signal diagram 150 that illustrates frequency channels of an optical network, according to at least one embodiment in the present disclosure. For example, FIG. 1B may illustrate frequency channels that may be part of the optical network 120 of FIG. 1.

The diagram 150 may include a frequency spectrum 152 and a plurality of frequency channels including a first channel 160a, a second channel 160b, a third channel 160c, and a fourth channel 160d, referred to collectively as the channels 160. Each of the channels 160 may be centered on center frequencies. As illustrated, each of the channels 160 may include a similar bandwidth, however, each of the channels 160 may include different bandwidths or some of the channels 160 may include the same bandwidths and other of the channels 160 may include different bandwidths.

As illustrated, some of the channels 160 may be adjacent other channels 160. For example, the first channel 160a may be adjacent to the second channel 160b. In some embodiments, adjacent channels may include frequencies that are directly adjacent or have some overlap in frequencies. Alternately or additionally, adjacent channels may be channels with no channels therebetween.

In some embodiments, each of the channels 160 may be configured to carry an optical signal or a part of an optical signal. In these and other embodiments, each of the channels 160 may carry an optical signal or part of an optical signal simultaneously such that each channel 160 carries a separate optical signal or part of an optical signal at the same time or in overlapping time periods. As an example, the bandwidths of the channels 160 may range between 1 and 500 GHz and the center frequencies of the channels 160 may be between 100 THz and 1000 THz or other ranges of frequencies. Modifications, additions, or omissions may be made to the diagram 150 without departing from the scope of the present disclosure.

Returning to a discussion of FIG. 1A, a frequency channel along an optical path may also include noise. The noise may include amplified spontaneous emission (ASE) noise due to the network elements along the path. The noise may also include nonlinear interference (NLI) noise due to optical signals propagating along the optical path.

In some embodiments, the nonlinear interference (NLI) noise due to optical signals propagating along an optical path may be different among the frequency channels in the optical network 120. For example, the NLI noise may be greater for frequency channels with higher frequencies. An amount of the NLI noise and the ASE noise in a frequency channel may affect a SNR of an optical signal carried by the frequency channel. As such, an optical signal with similar characteristics carried by a first frequency channel may have a first SNR and a second SNR when carried by a second frequency channel.

Figure 1C:
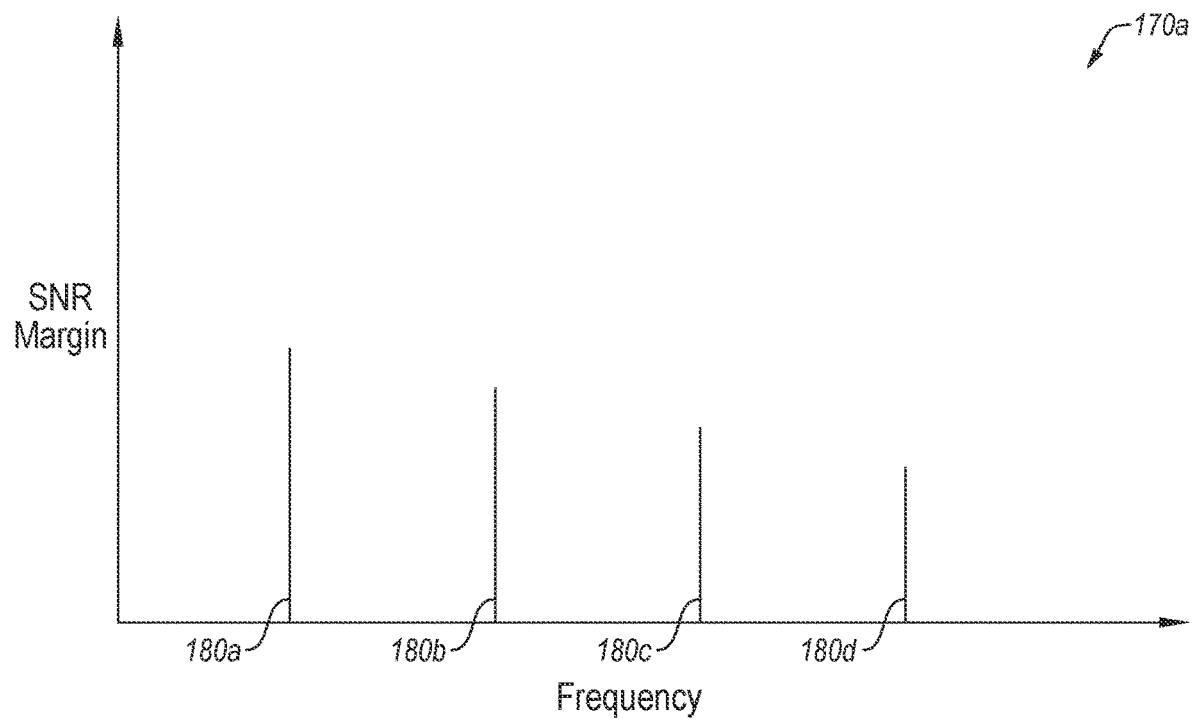
FIGS. 1C and 1D illustrates signal-to-noise ratio margins of frequency channels of an optical network.

FIG. 1C illustrates an example diagram 170a that illustrates SNR margins of frequency channels of an optical network, according to at least one embodiment in the present disclosure. The SNR margin may indicate a difference between the SNR of an optical signal and an SNR to achieve a particular information rate along with a particular bit error bit (BER) for an optical signal. The information rate may be a number of bits per symbol carried by the optical signal.

FIG. 1C may illustrate SNR margins of the channels 160 of FIG. 1B. The diagram 170 may illustrate a first SNR margin 180a, a second SNR margin 180b, a third SNR margin 180c, and a fourth SNR margin 180d, referred to collectively as the SNR margins 180. As illustrated, as the frequency increases the SNR margins 180 of an optical signal may decrease due to the increase in NLI noise.

Figure 1D:
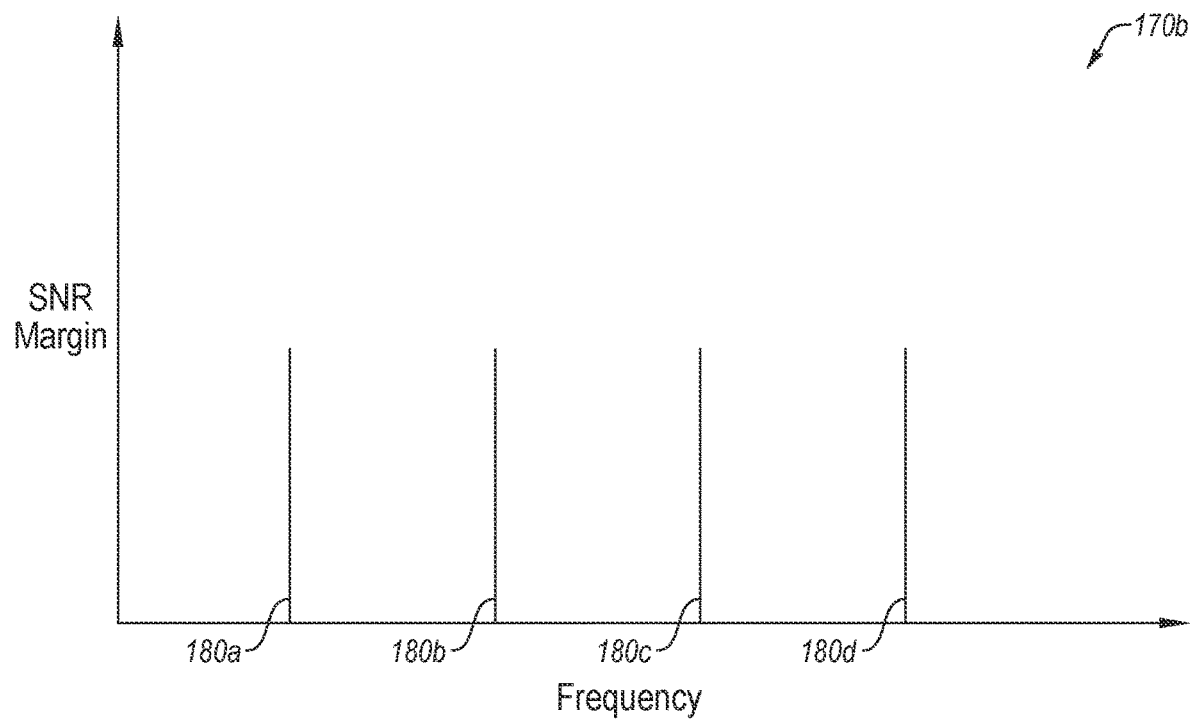

Returning to a discussion of FIG. 1A, the adjustment system 110 may be configured to direct adjustment of one or more characteristics of an optical signal such that a SNR margin may be consistent across different frequency channels. For example, FIG. 1D illustrates an example diagram 170b that illustrates SNR margins of frequency channels of an optical network after adjustments to the optical signals, according to at least one embodiment in the present disclosure. As illustrated, as the frequency increases, the SNR margin 180 of an optical signal may be maintained.

Returning to a discussion of FIG. 1A, the adjustment system 110 may direct adjustment of one or more characteristics of optical signals such that SNR margins may be consistent or more consistent across different frequency channels while also maintaining a consistent or more consistent data rate of the optical signals. In some embodiments, the adjustment system 110 may include any configuration of hardware, such as processors, servers, and storage servers that are networked together and configured to perform a task. For example, the adjustment system 110 may include one or multiple computing systems, such as multiple servers that each include memory and at least one processor.

In some embodiments, the adjustment system 110 may be configured to direct adjustment of a number of bits per symbol, referred to as an information rate (IR), and a number of symbols per second, referred to as a symbol rate (SR), e.g., a baud rate of an optical signal. For example, the adjustment system 110 may be configured to direct reduction of the information rate. Alternately or additionally, the adjustment system 110 may be configured to direct an increase in symbol rate.

In some embodiments, reducing a number of bits per symbol may increase the SNR margin based on Shannon's capacity theorem that states that $$IR = \log_2(1+SNR)$$

where IR is the information rate. As indicated by the equation, reducing the information rate results in a reduced SNR to be able to decode the symbols at a desired bit error rate (BER). Thus, an SNR of an optical signal may not change by decreasing the information rate, but the SNR margin may increase. As an example, an optical signal may have a SNR of 20 dB and SNR margin of 5 dB with a first information rate based on a required SNR of 15 dB for the first information rate. By reducing the first information rate to a second information rate, the required SNR for the second information rate may be 10 dB. As such, the SNR margin may increase from 5 dB to 10 dB even though the SNR of the optical signal was maintained at 20 dB.

In these and other embodiments, reducing the information rate may result in a decrease in the data rate (DR). However, the reduction in the information rate may be offset by an increase in the symbol rate. In these and other embodiments, the data rate may be based on the symbol rate and the information rate. For example, DR=IR*SR. Thus, increasing the symbol rate when decreasing the information rate may allow the data rate to be maintained. Thus, by adjusting one or more characteristics of an optical signal, the adjustment system 110 may maintain a similar data rate for frequency channels in an optical network while reducing SNR margin variations among the frequency channels.

In some embodiments, the adjustment system 110 may be configured to determine an amount of an adjustment based on a SNR for optical signals in the frequency channels. The adjustment system 110 may obtain a SNR for an optical signal in a frequency channel. The adjustment system 110 may compare the SNR to a particular SNR to determine a difference therebetween. Based on the difference between the SNR and the particular SNR, the adjustment system 110 may reduce the information rate. For example, based on a larger difference, the adjustment system 110 may reduce the information rate by a larger amount and based on a smaller difference, the adjustment system 110 may reduce the information rate by a smaller amount.

In some embodiments, an amount that the adjustment system 110 directs the information rate to be reduced may be determined based on Shannon's capacity theorem. For example, Shannon's capacity theorem may be used to determine a change in the information rate that results in a change in the SNR that may be equal to the difference between the SNR and the particular SNR. In some embodiments, the adjustment system 110 may perform the calculation. Alternately or additionally, the adjustment system 110 may use a look-up table with calculated values that may indicate a change in the information rate for a particular difference in the SNR. Alternately or additionally, any other method may also be used to determine the change in the information rate.

In some embodiments, the particular SNR for an optical signal may be based on an SNR threshold for error-free operation of an optical signal. For example, when a bit error ratio (BER) after forward error correction (FEC) is about or below $10^{-15}$ the optical signal may be considered to be operating error-free.

In some embodiments, the change in the information rate may occur through changing a modulation format used to modulate the information to be transmitted. For example, in some embodiments, the change in the information rate may occur through changing from a higher order modulation format to a lower order modulation format, such as from a higher order quadrature amplitude modulation (QAM) to a lower order QAM. Alternately or additionally, the change in the information rate may occur through changing between different types of modulation formats, such as between QAM, quadriphase shift key (QPSK) modulation, and biorthogonal modulation.

In some embodiments, the change in the information rate may occur and the modulation format may be maintained. For example, in these and other embodiments, a number of information bits modulated using the same modulation format may be reduced. For example, the modulation format may be 16 QAM, which may modulate four bits of information per symbol using a uniform QAM modulation. However, probabilistic shaping may be used to reduce a number of bits of information per symbol modulated using the 16 QAM format. For example, the number of information bits may range between two and four bits for a 16QAM format. Thus, reducing the information rate may not result in a change of the modulation format being employed. Rather, reducing the information rate may include reducing the number of bits of information modulated onto each symbol by adjusting the entropy of the modulation format being employed.

In some embodiments, a particular SNR margin may not be achievable by maintaining a current modulation format of a probabilistically shaped signal. For example, to achieve larger SNR margin gains, larger changes in the information rate may occur. However, a range of potential information rates may be limited by the modulation format being used. For example, an information rate for a probabilistically shaped signal may be defined as follows:

$$IR=H(x)-(1-c)*m$$

where H(x) indicates an entropy of the probabilistic shaping and thus the number of information bits per symbol, c is the forward error correction (FEC) code rate, and m is the modulation order.

As an example, low order probabilistically shaped QAM formats may have smaller number of information bits per symbol ranges, e.g., smaller ranges for the value of H(x), as compared to higher order QAM formats. For example, a 16QAM may have a range of 2.0 bits per symbol to 4.0 bits per symbol and a 256QAM may have a range of 2.0 bits per symbol to 8.0 bits per symbol. Thus, when a larger information rate changes is desired, a change in the modulation format may occur to achieve the larger information rate change. For example, a probabilistically shaped 16QAM format at 3.0 bits per symbol may be employed. Based on a particular SNR margin gain, a change in the information rate of 2.0 bits per symbol may be determined to be used. However, the range of the probabilistically shaped 16QAM format may not allow for a 2.0 bits per symbol change if the current rate is 3.0 bits. In these and other embodiments, the modulation format may be changed to 64QAM with a larger range of bits per symbol such that the change in the information rate may be accomplished. As another example, a probabilistically shaped 16QAM format at 3.0 bits per symbol may be employed. Based on a particular SNR margin gain, a change in the information rate of 1.0 bit per symbol may be determined as the information rate to be used. In these and other embodiments, the modulation format may be changed to 64QAM to achieve the information rate.

In some embodiments, a change in the modulation format may be determined based on the difference between the SNR and the particular SNR satisfying a threshold, such as being larger than a threshold. In these and other embodiments, the threshold may be based on a current modulation format being employed and a range of the current modulation format. For example, when 16QAM is employed, a threshold of 13 dB may be used because a gain larger than 13 dB may not be achieved by adjusting the 16QAM format but may be achieved by changing the modulation format and selecting a particular information rate for the new modulation format.

In some embodiments, it may be recognized that for smaller SNR margin gains, lower order modulation formats may be employed and for larger SNR margin gains higher order modulation formats may be employed. For example, for SNR margin gains above a threshold, one or more first modulation formats may be selected and for SNR margin gains below the threshold one or more second modulation formats may be selected. Thus, selection of a modulation format may be based on the SNR margin gain to be achieved. Thus, reducing the information rate may further include selecting a modulation format and a particular information rate for the modulation format.

After determining the change in the information rate, the adjustment system 110 may determine a change in the symbol rate. The change in the symbol rate may be determined based on the formula of DR=IR*SR. Thus, the symbol rate may increase by the same or approximately the same amount that the information rate decreases to maintain a data rate. In some embodiments, the adjustment system 110 may perform the calculation using the above equation. Alternately or additionally, the adjustment system 110 may use a look-up table with calculated values that may indicate a change in the symbol rate for a particular change in the information rate. Alternately or additionally, any other method may also be used to determine the change in the symbol rate.

In some embodiments, changing the symbol rate may result in the allocation of more frequency bandwidth for a channel. For example, a first range of symbol rates may be accommodated by a first frequency bandwidth in the optical network 120. When increasing the symbol rate, the symbol rate may be increased to be outside of the first range of symbol rates. As a result, the frequency bandwidth allocated for the channel may be increased to accommodate the larger symbol rate.

Thus, as discussed in this disclosure, the adjustment system 110 may adjust one or more characteristics of optical signals such that SNR margins may be more consistent across different frequency channels while also maintaining a consistent data rate of the optical signals. By increasing the SNR margins, a distance that an optical signal may travel while maintaining an integrity of the data above a threshold may be increased. Other benefits may be achieved by adjusting one or more characteristics of optical signals such that SNR margins may be consistent across different frequency channels while also maintaining a consistent data rate of the optical signals.

Modifications, additions, or omissions may be made to the environment 100 without departing from the scope of the present disclosure.

Figure 2:
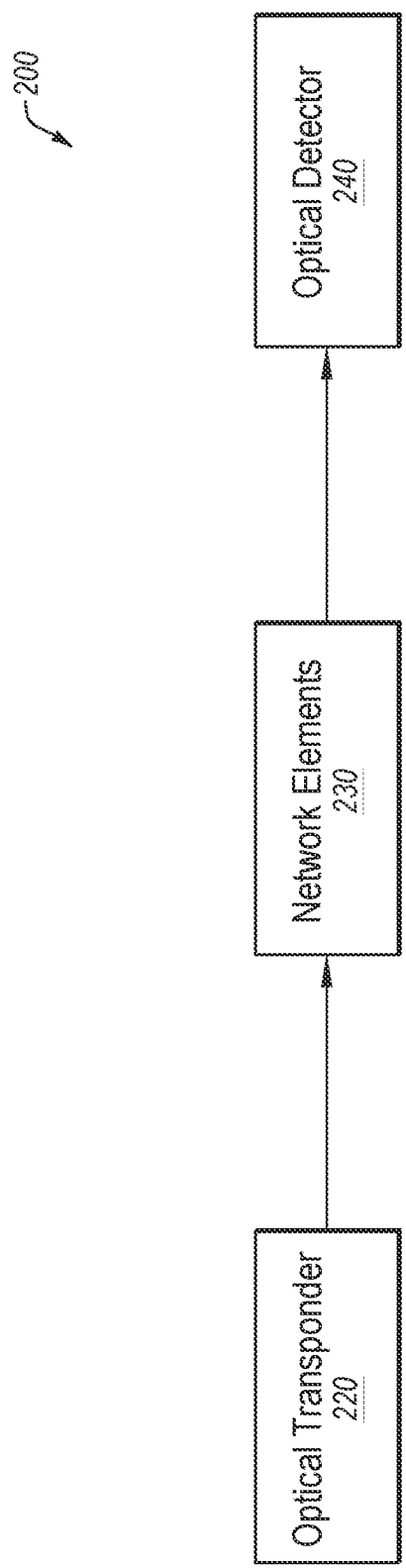
FIG. 2 illustrates elements of an example optical network.

FIG. 2 illustrates elements of an example optical network 200, according to at least one embodiment in the present disclosure. The optical network 200 may include an optical transponder 220, network elements 230, and an optical detector 240.

The optical network 200 may be an example of a part of the optical network 120 of FIG. 1. The network elements 230 may be examples of elements discussed in FIG. 1, such as the optical nodes 122, the optical links 130, and the elements within the optical nodes 122 and the optical links 130, such as the optical fiber, repeaters, wavelength division multiplexers, transmitter, receivers, and transponders, among others.

The optical network 200 may be configured to support multiple optical signals simultaneously. Each of the optical signals may be configured to traverse a frequency channel within the optical network 200. For example, a first optical signal may be transmitted in a first frequency channel and a second optical signal may be transmitted in a second frequency channel.

In general, the optical network 200 may be configured to adjust one or more characteristics of optical signals such that SNR margins may be consistent across different frequency channels while also maintaining a consistent data rate of the optical signals.

In some embodiments, the optical transponder 220 may be configured to adjust a modulation format, an information rate, a symbol rate, or a channel bandwidth, among other characteristics of an optical signal as discussed in this disclosure. For example, the optical transponder 220 may be directed to decrease an information rate and to increase the symbol rate for a particular frequency channel in the optical network 200. In these and other embodiments, in response to decreasing an information rate and increasing the symbol rate for a particular channel, the optical transponder 220 may maintain the information rate and the symbol rate of other frequency channels in the optical network 200.

In some embodiments, the optical transponder 220 may be configured to determine the adjustments to the characteristics of optical signals. Alternately or additionally, the optical transponder 220 may be directed from another device or system to apply adjustments to the characteristics of optical signals determined by the other device or system.

In some embodiments, the optical transponder 220 may be configured to adjust the information rate by applying probabilistic shaping to a modulated format. During probabilistic shaping, the optical transponder 220 may set a number of bits per symbol. Note that during probabilistic shaping, that the number of bits may not be a whole number. In these and other embodiments, the optical transponder 220 may maintain the other elements used to determine the information rate and may change the number of bits per symbol. In some embodiments, the optical transponder 220 may be further configured to adjust the modulation format used to modulate the optical signal.

In some embodiments, the optical transponder 220 may be further configured to adjust the symbol rate. In these and other embodiments, the optical transponder 220 may increase the symbol rate to a value to maintain a data rate of the optical signal being adjusted. The optical transponder 220 may apply the adjustments to an optical signal that is being transmitted along the network elements 230.

In some embodiments, the optical transponder 220 may apply adjustments to an optical signal during operation of the optical signal. For example, during operation of an optical signal it may be determined that some SNR margins of the optical signal are degraded as compared to the SNR margins of other optical signals in the optical network 200 or as compared to previous SNR margin of the optical signal. In these and other embodiments, the optical transponder 220 may apply the adjustments to the optical signal during operation of the optical signal.

Alternately or additionally, the adjustments for an optical signal may be determined before the optical signal is deployed in the optical network 200. In these and other embodiments, based on estimates of SNR margins from channel probing, calculations, or other methods to obtain estimated SNR, adjustments to characteristics of an optical signal may be made such that when deployed the optical signal may include a desired SNR margin among different frequency channels while maintaining a data rate of the optical signal as compared with other optical signals in the optical network 200.

In some embodiments, the optical detector 240 may be configured to measure noise and power of optical signals at frequencies within the optical network 200. For example, the optical detector 240 may be configured to measure power levels of noise in frequency channels and power levels of optical signals. Using the information from the optical detector 240, the SNR of the frequency channels may be determined, and the SNR margins of the frequency channels may also be determined. In these and other embodiments, the optical detector 240 may also be configured to measure power levels of noise and probing optical signals to obtain estimates of SNR for optical signals before deployment of the optical signals.

Modifications, additions, or omissions may be made to the optical network 200 without departing from the scope of the present disclosure.

Figure 3:
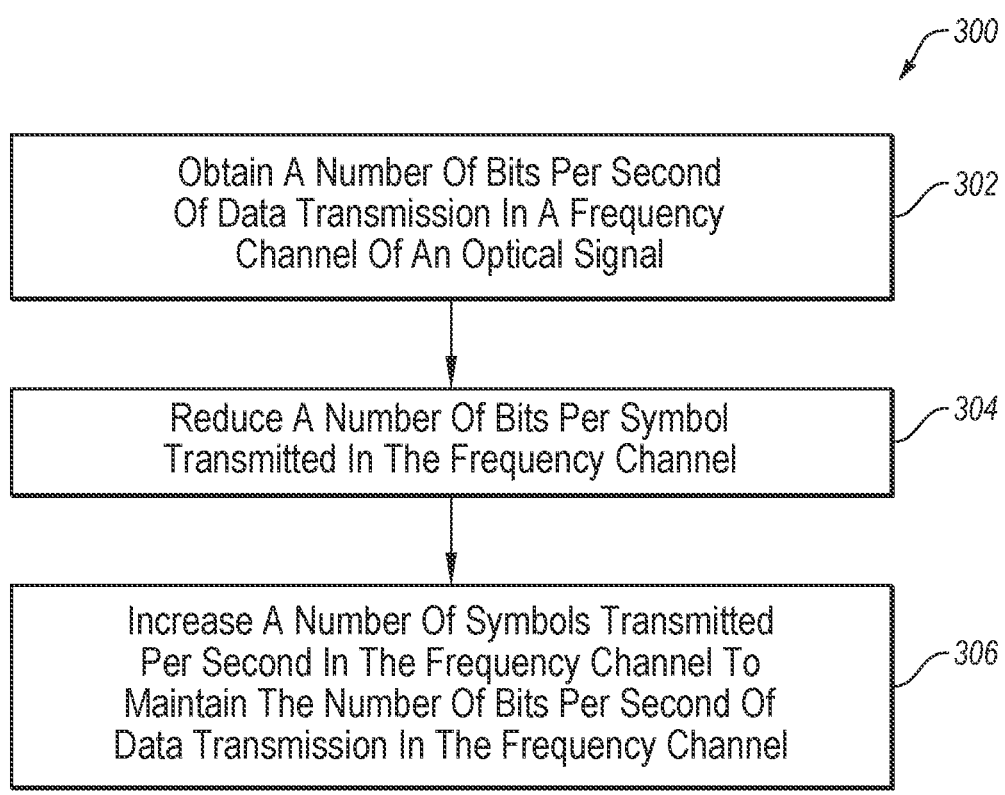
FIG. 3 illustrates a flowchart of an example method of optical signal adjustment.

FIG. 3 illustrates a flowchart of an example method 300 of optical signal adjustment. The method 300 may be arranged in accordance with at least one embodiment described in the present disclosure. One or more operations of the method 300 may be performed, in some embodiments, by a device or system, such as the adjustment system 110 of FIG. 1, the system 500 of FIG. 5 or another device, combination of devices, system, or systems. In these and other embodiments, the method 300 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method may begin at block 302, where a number of bits per second of data transmission in a frequency channel of an optical network may be obtained. In some embodiments, the optical signal may be configured to operate across multiple frequency channels that include the frequency channel.

At block 304, a number of bits per symbol transmitted in the frequency channel may be reduced. In some embodiments, the number of bits per symbol transmitted in the frequency channel may be reduced using probabilistic shaping of the symbol. In some embodiments, the method 300 may include directing the reduction of the number of bits per symbol transmitted in the frequency channel.

At block 306, a number of symbols transmitted per second in the frequency channel may be increased to maintain the number of bits per second of data transmission in the frequency channel. In some embodiments, a number of bits per symbol and a number of symbols transmitted per second in another frequency channel of the multiple frequency channels may be maintained when the number of bits per symbol and the number of symbols transmitted per second in the frequency channel is adjusted. In these and other embodiments, the number of bits per second of data transmission in each of the multiple frequency channels may be the same. In some embodiments, the method 300 may include directing the increase of the number of symbols transmitted per second in the frequency channel.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiment the method 300 may include obtaining a signal-to-noise ratio of the optical signal in the frequency channel and determining a difference between the signal-to-noise ratio and a particular signal-to-noise ratio. In these and other embodiments, the number of bits per symbol transmitted in the frequency channel may be reduced based on the difference between the signal-to-noise ratio and the particular signal-to-noise ratio. In these and other embodiments, the optical network may include multiple frequency channels and the particular signal-to-noise ratio may be selected based on a signal-to-noise ratio of another frequency channel of the multiple frequency channels. In these and other embodiments, the frequencies in the other frequency channel may be lower than frequencies in the frequency channel.

Figure 4:
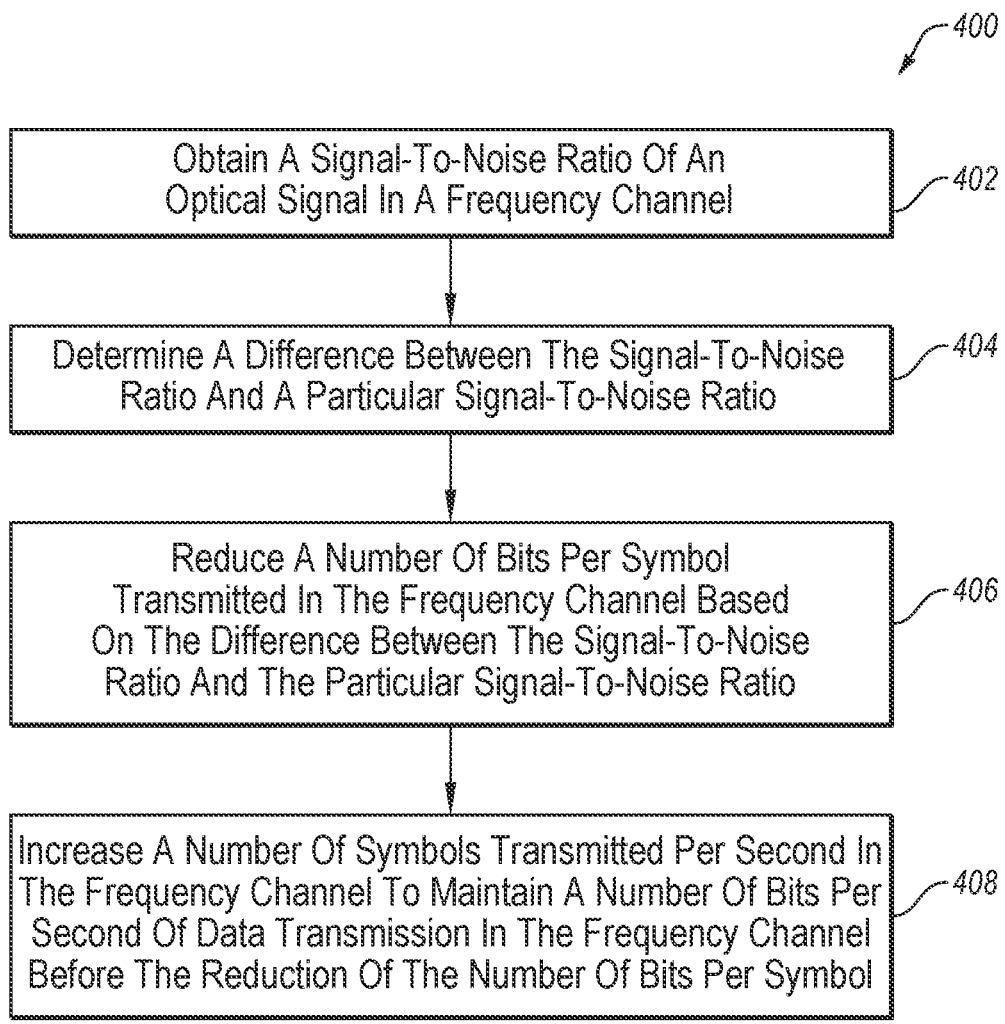
FIG. 4 illustrates a flowchart of another example method of optical signal adjustment.

FIG. 4 illustrates a flowchart of another example method 400 of optical signal adjustment. The method 400 may be arranged in accordance with at least one embodiment described in the present disclosure. One or more operations of the method 400 may be performed, in some embodiments, by a device or system, such as the adjustment system 110 of FIG. 1 and the system 500 of FIG. 5 or another device, combination of devices, system, or systems. In these and other embodiments, the method 400 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method may begin at block 402, where a signal-to-noise ratio of an optical signal in a frequency channel of an optical network may be obtained.

At block 404, a difference between the signal-to-noise ratio and a particular signal-to-noise ratio may be determined. In some embodiments, the optical network may include multiple frequency channels and the particular signal-to-noise ratio may be a signal-to-noise ratio of another frequency channel of the multiple frequency channels. In these and other embodiments, the number of bits per second of data transmission in each of the multiple frequency channels may be the same.

At block 406, a number of bits per symbol transmitted in the frequency channel may be reduced based on the difference between the signal-to-noise ratio and the particular signal-to-noise ratio. In some embodiments, a modulation scheme of the optical signal in the frequency channel may be maintained when reducing the number of bits per symbol transmitted in the frequency channel. Alternately or additionally, in response to the difference between the signal-to-noise ratio and the particular signal-to-noise ratio satisfying a threshold, the reducing the number of bits per symbol transmitted in the frequency channel may include changing a modulation scheme of the frequency channel. In some embodiments, the method 400 may include directing the reduction of the number of bits per symbol transmitted in the frequency channel.

At block 408, a number of symbols transmitted per second in the frequency channel may be increased to maintain a number of bits per second of data transmission in the frequency channel before the reduction of the number of bits per symbol. In some embodiments, a number of bits per symbol and a number of symbols transmitted per second in another frequency channel of the multiple frequency channels may be maintained when the number of bits per symbol and the number of symbols transmitted per second in the frequency channel is adjusted. In some embodiments, the method 400 may include directing the increase of the number of symbols transmitted per second in the frequency channel.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

Figure 5:
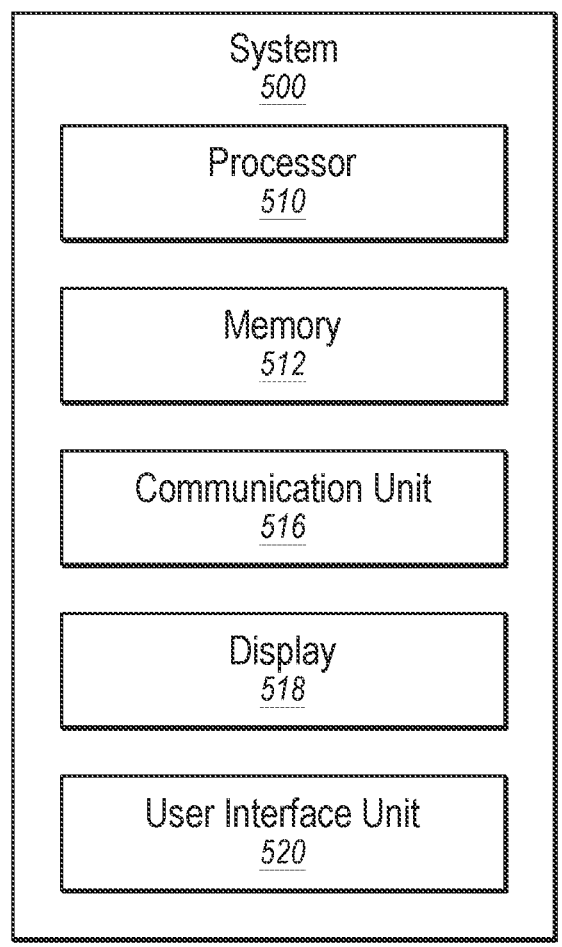
FIG. 5 illustrates an example system that may be used for optical signal adjustment.

FIG. 5 is a block diagram illustrating an example system 500 that may be used for optical signal adjustment, according to at least one embodiment of the present disclosure. The system 500 may include a processor 510, memory 512, a communication unit 516, a display 518, and a user interface unit 520, which all may be communicatively coupled. In some embodiments, the system 500 may be used to perform one or more of the methods described in this disclosure.

For example, the system 500 may be used to perform one or more of the methods described in FIGS. 3 and 4. Alternately or additionally, the system 500 or parts of the system 500 may be part of the adjustment system 110 of FIG. 1 or the optical network 200 of FIG. 2.

Generally, the processor 510 may include any suitable special-purpose or general-purpose computer, computing entity, or processing device including various computer hardware or software modules and may be configured to execute instructions stored on any applicable computer-readable storage media. For example, the processor 510 may include a microprocessor, a microcontroller, a parallel processor such as a graphics processing unit (GPU) or tensor processing unit (TPU), a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 5, it is understood that the processor 510 may include any number of processors distributed across any number of networks or physical locations that are configured to perform individually or collectively any number of operations described herein. In some embodiments, the processor 510 may interpret and/or execute program instructions and/or process data stored in the memory 512. In some embodiments, the processor 510 may execute the program instructions stored in the memory 512.

For example, in some embodiments, the processor 510 may execute program instructions stored in the memory 512 that are related to task execution such that the system 500 may perform or direct the performance of the operations associated therewith as directed by the instructions. In these and other embodiments, the instructions may be used to perform one or more blocks of method 300 or 400 of FIGS. 3 and 4.

The memory 512 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 510.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media.

Computer-executable instructions may include, for example, instructions and data configured to cause the processor 510 to perform a certain operation or group of operations as described in this disclosure. In these and other embodiments, the term "non-transitory" as explained in the present disclosure should be construed to exclude only those types of transitory media that were found to fall outside the scope of patentable subject matter in the Federal Circuit decision of In re Nuijten, 500 F.3d 1346 (Fed. Cir. 2007). Combinations of the above may also be included within the scope of computer-readable media.

The communication unit 516 may include any component, device, system, or combination thereof that is configured to transmit or receive information over a network. In some embodiments, the communication unit 516 may communicate with other devices at other locations, the same location, or even other components within the same system. For example, the communication unit 516 may include a modem, a network card (wireless or wired), an infrared communication device, a wireless communication device (such as an antenna), and/or chipset (such as a Bluetooth® device, an 802.6 device (e.g., Metropolitan Area Network (MAN)), a WiFi device, a WiMax device, cellular communication facilities, etc.), and/or the like. The communication unit 516 may permit data to be exchanged with a network and/or any other devices or systems described in the present disclosure.

The display 518 may be configured as one or more displays, like an LCD, LED, Braille terminal, or other type of display. The display 518 may be configured to present video, text captions, user interfaces, and other data as directed by the processor 510.

The user interface unit 520 may include any device to allow a user to interface with the system 500. For example, the user interface unit 520 may include a mouse, a track pad, a keyboard, buttons, camera, and/or a touchscreen, among other devices. The user interface unit 520 may receive input from a user and provide the input to the processor 510. In some embodiments, the user interface unit 520 and the display 518 may be combined.

Modifications, additions, or omissions may be made to the system 500 without departing from the scope of the present disclosure. For example, in some embodiments, the system 500 may include any number of other components that may not be explicitly illustrated or described. Further, depending on certain implementations, the system 500 may not include one or more of the components illustrated and described.

As indicated above, the embodiments described herein may include the use of a special purpose or general-purpose computer (e.g., the processor 510 of FIG. 5) including various computer hardware or software modules, as discussed in greater detail below. Further, as indicated above, embodiments described herein may be implemented using computer-readable media (e.g., the memory 512 of FIG. 5) for carrying or having computer-executable instructions or data structures stored thereon.

In some embodiments, the different components, modules, engines, and services described herein may be implemented as objects or processes that execute on a computing system (e.g., as separate threads). While some of the systems and methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method of optical signal adjustment, the method comprising:
    obtaining a number of bits per second of data transmission in a frequency channel of an optical network that includes a plurality of frequency channels;
    directing a reduction in a number of bits per symbol transmitted in the frequency channel; and
    directing an increase in a number of symbols transmitted per second in the frequency channel to maintain the number of bits per second of data transmission in the frequency channel,
    wherein a number of bits per symbol and a number of symbols transmitted per second in another frequency channel of the plurality of frequency channels is maintained when the number of bits per symbol and the number of symbols transmitted per second in the frequency channel is adjusted.

2. The method of claim 1, wherein the number of bits per second of data transmission in each of the plurality of frequency channels is the same.

3. The method of claim 1, further comprising:
    obtaining a signal-to-noise ratio of an optical signal in the frequency channel; and
    determining a difference between the signal-to-noise ratio and a particular signal-to-noise ratio,
    wherein the number of bits per symbol transmitted in the frequency channel is reduced based on the difference between the signal-to-noise ratio and the particular signal-to-noise ratio.

4. The method of claim 3, wherein the particular signal-to-noise ratio is selected based on a signal-to-noise ratio of another frequency channel of the plurality of frequency channels.

5. The method of claim 4, wherein frequencies in the other frequency channel are lower than frequencies in the frequency channel.

6. The method of claim 1, wherein the number of bits per symbol transmitted in the frequency channel is reduced using probabilistic shaping of the symbol.

7. One or more non-transitory computer readable media configured to store instructions, that when executed by a system cause the system to perform the method of claim 1.

8. A method of optical signal adjustment, the method comprising:
    obtaining a signal-to-noise ratio of an optical signal in a frequency channel of an optical network;
    determining a difference between the signal-to-noise ratio and a particular signal-to-noise ratio, directing a reduction in a number of bits per symbol transmitted in the frequency channel based on the difference between the signal-to-noise ratio and the particular signal-to-noise ratio, wherein in response to the difference between the signal-to-noise ratio and the particular signal-to-noise ratio satisfying a threshold, the reducing the number of bits per symbol transmitted in the frequency channel includes changing a modulation scheme of the frequency channel; and directing an increase in a number of symbols transmitted per second in the frequency channel to maintain a number of bits per second of data transmission in the frequency channel before the reduction of the number of bits per symbol.

9. The method of claim 8, wherein the optical network includes a plurality of frequency channels, and the particular signal-to-noise ratio is a signal-to-noise ratio of another frequency channel of the plurality of frequency channels.

10. The method of claim 9, wherein the number of bits per second of data transmission in each of the plurality of frequency channels is the same.

11. The method of claim 8, wherein the optical network includes a plurality of frequency channels and a number of bits per symbol and a number of symbols transmitted per second in another frequency channel of the plurality of frequency channels is maintained when the number of bits per symbol and the number of symbols transmitted per second in the frequency channel is adjusted.

12. The method of claim 8, wherein a modulation scheme of the optical signal in the frequency channel is maintained when reducing the number of bits per symbol transmitted in the frequency channel.

13. An optical system comprising:
an optical network that includes a plurality of frequency channels, the optical network including:
an optical detector configured to determine a signal-to-noise ratio of an optical signal in a frequency channel; and
an optical transponder configured to:
reduce a number of bits per symbol transmitted in the frequency channel; and
increase a number of symbols transmitted per second in the frequency channel to maintain a number of bits per second of data transmission in the frequency channel before the reduction of the number of bits per symbol,
wherein a number of bits per symbol and a number of symbols transmitted per second in another frequency channel of the plurality of frequency channels is maintained when the number of bits per symbol and the number of symbols transmitted per second in the frequency channel is adjusted; and
a processor configured to determine a difference between the signal-to-noise ratio and a particular signal-to-noise ratio, wherein the number of bits per symbol transmitted in the frequency channel is reduced based on the difference between the signal-to-noise ratio and the particular signal-to-noise ratio.

14. The optical system of claim 13, wherein the particular signal-to-noise ratio is a signal-to-noise ratio of another frequency channel of the plurality of frequency channels.

15. The optical system of claim 14, wherein the number of bits per second of data transmission in each of the plurality of frequency channels is the same.

16. The optical system of claim 13, wherein a modulation scheme of the optical signal in the frequency channel is maintained when reducing the number of bits per symbol transmitted in the frequency channel.

17. The optical system of claim 13, wherein in response to the difference between the signal-to-noise ratio and the particular signal-to-noise ratio satisfying a threshold, the reducing the number of bits per symbol transmitted in the frequency channel includes changing a modulation scheme of the frequency channel.

\* \* \* \* \*